United States Patent
Hoxmeier et al.

(10) Patent No.: US 6,703,449 B1
(45) Date of Patent: Mar. 9, 2004

(54) BLOCK COPOLYMERS CONTAINING BOTH POLYSTYRENE AND LOW VINYL CONTENT POLYDIENE HARD BLOCKS

(75) Inventors: Ronald James Hoxmeier, Houston, TX (US); Michael Alan Masse, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 52 days.

(21) Appl. No.: 10/325,199

(22) Filed: Dec. 20, 2002

(51) Int. Cl.$^7$ ............................................. C08F 297/04
(52) U.S. Cl. ........................ 525/314; 525/98; 525/940; 524/575
(58) Field of Search ......................... 525/98, 314, 940; 524/575

(56) References Cited

U.S. PATENT DOCUMENTS

| | | | |
|---|---|---|---|
| 4,107,236 A | * 8/1978 | Naylor et al. | ............ 526/335 X |
| 4,880,878 A | * 11/1989 | Himes et al. | ................. 525/89 |
| 5,202,387 A | 4/1993 | Halasa et al. | ................ 525/316 |
| 5,510,423 A | * 4/1996 | Van Dijk et al. | ............ 525/316 |
| 5,795,944 A | 8/1998 | Graafland et al. | ........... 526/181 |

FOREIGN PATENT DOCUMENTS

| | | | | |
|---|---|---|---|---|
| EP | 0 254 346 | 1/1988 | ........... | C08L/53/02 |
| EP | 0 409 580 | 1/1991 | ........... | C08L/15/00 |
| EP | 0 555 930 | 8/1993 | ........... | C08L/23/08 |
| EP | 0 976 871 | 2/2000 | ........... | E01C/19/41 |

OTHER PUBLICATIONS

PCT International Search Report from International App. No. PCT/US01/20225, dated Feb. 28, 2002.

* cited by examiner

Primary Examiner—Fred Teskin

(57) ABSTRACT

The present invention provides block copolymers which have reduced solvent sensitivity and which overcome the foregoing disadvantages. In one embodiment of the present invention, there is provided an asymmetric block copolymer of the structure A-B-C-A wherein each A block is formed of a vinyl aromatic hydrocarbon, preferably styrene, and has a weight average molecular weight of 5,000 to 50,000. B is a polybutadiene block having a weight average molecular weight of 1,000 to 15,000 and a vinyl content of less than 25% by weight, and C is an elastomeric conjugated diene polymer block having a weight average molecular weight of 25,000 to 200,000 and has a vinyl content of 30 to 90%, preferably 35 to 80%, and most preferably 35 to 70% by weight. In the second embodiment of the present invention, there is provided a hydrogenated block copolymer of the formula A-B-C-B-A wherein A, B, and C have the definitions set forth above.

14 Claims, No Drawings

BLOCK COPOLYMERS CONTAINING BOTH POLYSTYRENE AND LOW VINYL CONTENT POLYDIENE HARD BLOCKS

FIELD OF THE INVENTION

This invention is concerned with improved block copolymers. More particularly, it is directed to block copolymers having both polystyrene and low vinyl content polydiene hard blocks to give improved resistance to organic solvents.

BACKGROUND OF THE INVENTION

Block copolymers of styrene and conjugated dienes such as butadiene and isoprene are well known. Such block copolymers are often selectively hydrogenated so that they contain blocks of polystyrene and blocks of hydrogenated polydiene. The most common configuration for these polymers is the general structure A-B-A where each A is a styrene polymer block and B is a conjugated diene polymer block. These polymers are generally referred to as thermoplastic elastomers because they behave as a vulcanized rubber below their softening point but act as a thermoplastic melt above the softening point and, moreover, even after being raised to such a melt temperature and thereafter cooled, these polymers resume the properties of an elastomer. The diene used to make the polydiene block in these polymers generally must have a relatively high vinyl content, i.e. at least about 25% and preferably up to about 40% by weight because if the vinyl content is lower than that, when the polymer is hydrogenated, the polydiene block is not sufficiently elastomeric in nature.

These polymers exhibit an excellent range and variety of physical properties, including the strength and elastomeric properties described above. However, they have certain limiting characteristics, one of the most serious of which is their sensitivity to organic solvents and particularly to relatively volatile hydrocarbons. Contact with such solvents causes dissolution of the polymer or at least an undesirably high degree of swelling depending on the circumstances and species of the solvents involved as well as upon the particular block copolymers so exposed. It would be highly desirable to eliminate or minimize this solvent sensitivity so as to broaden the utility of these block copolymers.

Several attempts have been made to make slightly different polymers which exhibit improved resistance to solvent attack. Japanese published application JP06306127 describes oil resistant hydrogenated block copolymers which comprise a block of polybutadiene with a vinyl content of above 80% and number average molecular weight of 3,000 to 30,000, an isoprene or isoprene-butadiene block with a vinyl content above 40% and a number average molecular weight of 30,000 to 200,000, and a vinyl aromatic hydrocarbon (styrene) block with a molecular weight of 40,000 to 300,000. These polymers are disadvantageous because the high vinyl or isoprene-butadiene mixed block offer no physical reinforcement in the presence of solvents. Japanese published application 06306128 describes oil resistant hydrogenated 40,000 to 300,000 molecular weight block copolymers of the A-B-A structure, wherein the A blocks are blocks of butadiene with a vinyl content of above 80% and a number average molecular weight of 3,000 to 30,000 and the B block is an isoprene or isoprene-butadiene block with a vinyl content above 40% and a number average molecular weight of 30,000 to 200,000. These polymers are disadvantageous because they are very weak unless the A block molecular weight is 20,000 to 30,000 wherein they are very difficult to manufacture because they have extremely high solution viscosities and again the high vinyl blocks offer no physical resistance to the effects of solvents.

U.S. Pat. No. 3,670,054 describes hydrogenated block copolymers having reduced solvent sensitivity which have the structure C-A-B-A-C wherein each A is a vinyl aromatic hydrocarbon (styrene) block having a molecular weight of 7,500 to 100,000, B is an elastomeric conjugated diene polymer block having a molecular weight of 25,000 to 200,000 and having a vinyl content of 35 to 55%, and each C is a polybutadiene block having a molecular weight between 1,000 and 15,000 and having a vinyl content of less than 25% by weight. These polymers are disadvantageous because they are easily gelled during processing and production by crystallization of both endblocks of the molecule.

SUMMARY OF THE INVENTION

The present invention provides block copolymers which have reduced solvent sensitivity and which overcome the foregoing disadvantages. In one embodiment of the present invention, there is provided an asymmetric block copolymer of the structure A-B-C-A wherein each A block is formed of a vinyl aromatic hydrocarbon, preferably styrene, and has a weight average molecular weight of 5,000, preferably 7,500, to 50,000, B is a polybutadiene block having a weight average molecular weight of 1,000 to 15,000 and a vinyl content of less than 25% by weight, and C is an elastomeric conjugated diene polymer block having a weight average molecular weight of 25,000 to 200,000 and has a vinyl content of 30 to 90%, preferably 35 to 80%, and most preferably 35 to 70% by weight. In the second embodiment of the present invention, there is provided a hydrogenated block copolymer of the formula A-B-C-B-A wherein A, B, and C have the definitions set forth above.

DETAILED DESCRIPTION OF THE INVENTION

The term "vinyl content" refers to the fact that a conjugated diene is polymerized via 1,2-addition (in the case of butadiene—it would be 1,2 or 3,4 addition in the case of isoprene). Although a pure "vinyl" group is formed only in the case of 1,2 addition polymerization of 1,3 butadiene, the effects of 1,2 or 3,4 addition polymerization of isoprene (and similar addition for other conjugated dienes) on the final properties of the block copolymer will be similar. The term "vinyl" refers to the presence of a pendant vinyl group on the polymer chain. The purpose here is to introduce chain branching and thereby structural irregularity which yields a suppression of crystallinity.

The endblocks of these novel block copolymers are polymer blocks of styrene. Other vinyl aromatic hydrocarbons, including α-methylstyrene, various alkyl-substituted styrenes, alkoxy-substituted styrenes, vinyl naphthalene, vinyl toluene, and the like, can be substituted for styrene and are especially included in this invention. The butadiene used herein must produce a polymer block with a low vinyl content. In other words, the percent of 1,2 addition of the butadiene should be less than 25% by weight, preferably 1 to 10%. When the vinyl content of the polybutadiene block is below 25%, when it is hydrogenated it forms a hard, crystallizable block very similar to polyethylene. It is relatively resistant to solvent attack and assists the polymer as a whole in this regard as discussed in more detail below. The conjugated diene used herein for the internal hydrogenated elastomeric C block must produce a polymer block with a relatively high vinyl content. The percent of 1,2 addition of butadiene or 1,2 or 3,4 addition of isoprene must be in the range of 30 to 90%, preferably 35 to 80%, and most preferably 35 to 70%, because in this range, this polymer block will be elastomeric in nature and thus will give the polymer itself its elastomeric character.

The strength exhibited by the styrene-hydrogenated diene-styrene block copolymers of the prior art is in theory explained by the presence of polystyrene "domains" which form in the polymer. The polystyrene blocks from different molecules associate together and this physical crosslinking provides the mechanism for strength in styrenic block copolymers. These polystyrene domains, however, are glassy in nature. As such they are susceptible to swelling and dissolution by solvents. Even small amounts of solvents in the glassy polystyrene domains results in significant reductions in physical strength. These strength-forming domains become plasticized.

Crystalline polymers are known to be resistant to dissolution by solvents. While the solvents swell the amorphous segments of partially crystalline polymers like polyethylene, the crystalline segments require heating to lose their structural order and strength.

However, because of crystalline polymers' strength in the presence of solvents, processing can be difficult. In the case of block polymers having terminal crystalline blocks this difficulty can be severe. During polymerization or processing in solvents, the endblocks can crystallize and lead to gel formation.

The polymers of the present invention exhibit enhanced solvent resistance due to an inherent crystallinity of the polymer while maintaining good solvent processing characteristics.

As discussed above, the polymers of the present invention have the structure A-B-C-A or A-B-C-B-A. The A blocks are formed of polystyrene or some other vinyl aromatic hydrocarbon and have a weight average molecular weight of from 5,000, preferably 7,500, to 50,000, preferably 7,500 to 30,000. If the weight average molecular weight is lower, then the polystyrene domains do not possess enough strength and if the weight average molecular weight is higher, then process viscosities can be prohibitively high. The B blocks are low vinyl content polybutadiene blocks having a weight average molecular weight of 1,000 to 15,000. If the weight average molecular weight is lower, then the melting point and strength of this crystalline block will be too low and if the weight average molecular weight is higher, then processing difficulties due to gellation can result. The C block is an elastomeric conjugated diene polymer block as described having a weight average molecular weight of 25,000 to 200,000. If the molecular weight is lower, then the polymer can be insufficiently rubbery and if the weight average molecular weight is higher, then process viscosities can be prohibitively high.

The molecular weights of linear polymers or non-linked linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" (sometimes referred to as "apparent") molecular weight of the narrow molecular weight distribution observed. Usually, the peak value is between the number and the weight average. The peak (or apparent) molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Anionic polymerization of conjugated diene hydrocarbons with lithium initiators is well known as described in U.S. Pat. Nos. 4,039,593 and Re. 27,145 which descriptions are incorporated herein by reference. Polymerization commences with a monolithium, dilithium, or polylithium initiator which builds a living polymer backbone at each lithium site. Typical living polymer structures containing polymerized conjugated diene hydrocarbons are:

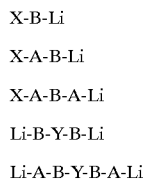

wherein B represents polymerized units of one or more conjugated diene hydrocarbons such as butadiene or isoprene, A represents polymerized units of one or more vinyl aromatic compounds such as styrene, X is the residue of a monolithium initiator such as sec-butyllithium, and Y is the residue of a dilithium initiator such as the diadduct of sec-butyllithium and m-diisopropenylbenzene. Some structures, including those pertaining to polylithium initiators or random units of styrene and a conjugated diene, generally have limited practical utility although known in the art.

The anionic polymerization of the conjugated diene hydrocarbons is typically controlled with structure modifiers such as diethylether or ethyl glyme (1,2-diethoxyethane) to obtain the desired amount of 1,2-addition. As described in Re 27,145 which is incorporated by reference herein, the level of 1,2-addition of a butadiene polymer or copolymer can greatly affect elastomeric properties after hydrogenation. In the absence of microstructure modifiers typical anionic polymerization conditions yield 7 to 10% 1,2-addition of butadiene. The 1,2-addition of butadiene polymers significantly and surprisingly influences the polymer as described above. A 1,2-addition of about 40% is achieved during polymerization at 50° C. with about 6% by volume of diethylether or about 200 ppm of ethyl glyme in the final solution. A 1,2 addition of about 47% (within the scope of this invention) is achieved during polymerization by the presence of about 250 ppm of ortho-dimethoxybenzene (ODMB) in the final solution. A 1,2 addition of 78% (within the scope of this invention) is achieved during polymerization by the presence of about 300 ppm of 1,2-diethoxypropane (DEP) in the final solution.

The microstructure of the polydiene block has a great effect on the nature of a hydrogenated polydiene block. When the vinyl content is low, a large concentration of diene polymerizes in the 1,4 (head-to-tail) orientation repeatedly. When this is hydrogenated, it looks like polyethylene and has the characteristics of crystalline polyethylene. The concentration of polyethylene crystals decreases with increasing 1,2 addition (i.e. vinyl content) and goes to 0 above about 55% vinyl content.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula:

RLi wherein R is an aliphatic, cycloaliphatic, alkyl-substituted cycloaliphatic, aromatic or alkyl-substituted aromatic hydrocarbon radical having from 1 to 20 carbon atoms.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane, heptane and the like, cycloaliphatic hydrocarbons such as cyclohexane, cycloheptane and the like, alkyl-substituted cycloaliphatic hydrocarbons such as methylcyclohexane, methylcycloheptane and the like, aromatic hydrocarbons such as benzene and the alkyl-substituted aromatic hydrocarbons such as toluene, xylene and the like and ethers such as tetrahydrofuran, diethylether, di-n-butyl ether and the like.

The hydrogenation of these polymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the present of a soluble hydrogenation catalysts. Such processes are disclosed in U.S. Pat. Nos. 3,113,986, 4,226,952 and Reissue 27,145, the disclosures of which are herein incorporated by reference. The polymers are hydrogenated in such a manner as to produce hydrogenated polymers having a residual unsaturation content in polydiene blocks of less than about 1 percent, and preferably as close to 0 percent as possible, of their original unsaturation content prior to hydrogenation. A titanium catalyst such as disclosed in U.S. Pat. No. 5,039,755, which is herein incorporated by reference, may also be used in the hydrogenation process.

The polymers of this invention are useful in compounds which are traditionally made with thermoplastic elastomers. Such compounds include compositions which comprise a block copolymer, from 0 to 300 parts by weight per 100 parts by weight of block copolymer (pbw) of a polymer selected from the group consisting of polyethylene, polypropylene, ethylene-propylene copolymers, polybutylene and poly(ethylene-α-olefin) copolymers, and from 0 to 400 pbw of an oil.

The advantage of the compounded rubber over the neat rubber is that some solvent resistance is gained by use of semi crystalline polymers such as polypropylene. However, the traditional block copolymers described above may still be attacked in the polystyrene blocks by oils, solvents, etc. as discussed above. As a result, compounds made with these polymers have not been suitable for many applications when a compound is to be exposed to these chemicals. When the block copolymers of the present invention are used in place of the traditional block copolymers, these compounds exhibit improved chemical resistance compared to the traditional block copolymers of similar hardness and physical properties. Improvements include reduced weight gain and increased strength retention. These compounds also handle and process easily.

EXAMPLES

All molecular weights are weight average.

Example 1

POLYMER SPEEB-1 was made according to the following procedure. 896 grams of cyclohexane were charged to a 1,400 cc Buchi reactor followed by the charge of 45 grams of styrene and then 6.42 mm of n-butyllithium and then this mixture was diluted with cyclohexane at a ratio of 4.3 ml/30 ml. The mixture was heated to 50° C. for ½ hour and then 19.28 grams of butadiene was charged to the mixture which was then heated to 60° C. for ½ hour.

Next, the microstructure modifier, ODMB, was added. 500 ppm of total solution (7 ml of a 10% weight solution) and then 160 grams of butadiene were charged to the reactor. The polymerization was carried out 60° C. for 30 minutes to produce a living polymer of polystyrene-low vinyl polybutadiene(LVB)-high vinyl polybutadiene(HVB). This polymer was then coupled with methylbenzoate at 70° C. for 1 hour. The polymer was then terminated stoichiometrically with methanol. GPC analysis indicated that the molecular weight of the coupled polymer (polystyrene-low vinyl polybutadiene-high vinyl polybutadiene-low vinyl polybutadiene-polystyrene) was 8,000-3,000-70,000-3,000-8,000 and the polymer was 58% coupled. The overall vinyl content was measured by NMR as 33%. The vinyl content of the low vinyl block was taken as 8% as is expected for the reaction conditions employed. The vinyl content of the high vinyl block was then calculated to be 36%.

The mixture of the polymer and solvent was diluted to 15% weight solids and 600 grams of this solution were placed into a hydrogenation reactor. The solution was purged with nitrogen for ½ hour and then a nickel octoate/aluminum triethyl hydrogenation catalyst containing 6,700 ppm of nickel was added at room temperature. The mixture was purged with hydrogen for 5 minutes and then heated in the 1-liter octoclave reactor to 90° C., all the time stirring the mixture.

50 ppm of the catalyst was added at room temperature, another 50 ppm was added after ½ hour at 84° C., and another 50 ppm was added under continued heating. After another half hour another 50 ppm was added. After another 15 minutes, 100 ppm of catalyst was added. Then after heating for an additional 20 minutes, the total conversion was 99%. The mixture was removed from the reactor, extracted with methanol, water, and concentrated hydrochloric acid. The water was separated, the mixture was coagulated with isopropyl alcohol, and then dried in a vacuum oven at 50° C. to produce the polymer.

The SPEEB-2 polymer was made according to a similar procedure. It had the S-LVB-HVB-LVB-S block molecular weight of 9-8-104-8-9 and was 65% coupled. The overall vinyl content was measured by NMR as 48%. The vinyl content of the LVB block was taken as 8% as is expected for the reaction conditions employed. The vinyl content of the HVB block was then calculated to be 54%.

SPEEB-3 was made slightly differently since it was an asymmetric polymer within the scope of the present invention. There was no coupling step. Each of the blocks was anionically polymerized sequentially. It has the structure S-LVB-HVB-S and had a molecular weight of 6,000-11,000-40,000-6,000. The vinyl content of the LVB block was taken as 8% as is expected for the reaction conditions employed. The vinyl content of the HVB was taken as 40% as is expected for the reaction conditions employed. The overall vinyl content is then calculated to be 33%.

Table 1 gives a comparison of the molecular properties and the tensile strengths of the SPEEBS polymers and compares them to those properties of several commercial hydrogenated styrene-butadiene-styrene block copolymers.

screw injection molding machine. All test specimens were cut from the injection molded plaques according to ASTM methods. Tensile properties were measured in both mold direction (MD, parallel to polymer flow) and perpendicular

TABLE 1

| Polymer ID | Structure (MW × 10⁻³) | | | | | (%) LVB Vinyl Content | (%) HVB Vinyl Content | (%) Overall Vinyl Content | (%) PSC | Tensile Strength (Psi) |
|---|---|---|---|---|---|---|---|---|---|---|
| | S | LVB | HVB | LVB | S | | | | | |
| SPEEB-3 | 6 | 11 | 40 | — | 6 | 8 | 40* | 33† | 20 | 6600 |
| Polymer 1 | 7 | — | 35 | — | 7 | — | 40* | 40* | 30 | 5100 |
| Polymer 2 | 10 | — | 47 | — | 10 | — | 40* | 40* | 30 | 6400 |
| SPEEB-1 | 8 | 3 | 70 | 3 | 8 | 8 | 36 | 33 | 17 | 4800 |
| SPEEB-2 | 9 | 8 | 104 | 8 | 9 | 8 | 54†† | 48 | 13 | 3500 |
| Polymer 3 | 5 | — | 73 | — | 5 | — | 40* | 40* | 13 | 2000 |

LVB = Low vinyl butadiene, vinyl content is taken as 8% in all cases.
HVB = High vinyl butadiene.
*HVB taken as 40% as expected for the reaction conditions employed.
†Calculated vinyl content basis LVB vinyl content and HVB vinyl content.
††Calculated from LVB vinyl content and measured overall vinyl content.

Example 2

The block copolymers evaluated in this example are described in Table 2. The SPEEB-4, 5, and 6 polymers are made according to a similar procedure to that described above. Polymer 4 is a commercially available hydrogenated SBS block copolymer.

to mold direction (PMD, transverse to polymer flow). Chemical resistance tests were run tensile specimens cut in the MD only.

Chemical resistance was evaluated by submerging test specimens into the following two fluids at the specified conditions:

TABLE 2

| Polymer ID | Structure (MW × 10⁻³) | | | | | Vinyl Content LVB (% wt)[1] | Vinyl Content HVB (% wt)[1] | PSC |
|---|---|---|---|---|---|---|---|---|
| | S | LVB | HVB | LVB | S | | | |
| Polymer 4 | 18.6 | 0 | 80.8 | 0 | 18.6 | — | 40 | 31.5 |
| SPEEB-4 | 14 | 9 | 72 | 9 | 14 | 8 | 40 | 23.7 |
| SPEEB-5 | 19 | 19 | 81 | 0 | 19 | 8 | 40 | 27.5 |

[1]Vinyl contents reported as expected for the reaction conditions employed.

The polymers were used with other materials to make compounds and then compared for various physical properties. The other materials used in the compounds are PP, a 5 melt flow index polypropylene homopolymer, DRAKEOL® 34 oil, a low volatility parathenic mineral oil made by Penreco, IRGANOX® 1010 antioxidant made by Ciba Geigy, and DLTDP, a propianate, synergistic antioxidant. The formulations were all a simple ternary blend of block copolymer, mineral oil, and polypropylene. The formulations contained 100 parts by weight of the block copolymer, either 50, 100, or 150 parts by weight of the oil per 100 parts of the block copolymer, 34 parts by weight of the polypropylene per 100 parts by weight of the block copolymer, 0.2 parts by weight of the IRGANOX® 1010 antioxidant, and 0.5 parts by weight of DLTDP.

The dry ingredients for each formulation were weighed and placed in a pre-blender. The oil was added as soon as the blender was started and mixing continued until the mixture became dry to the touch, about 3 to 4 minutes. The dry blends were subsequently compounded using a co-rotating twin screw extruder (30 mm diameter screws). The extruded strands were cooled in a chilled water bath and granulated. The pelletized compounds were injection molded into a 5.0×6.0×0.125 inch test plaque in a 100 ton reciprocating

TABLE 3

| Fluid | Temperature, ° C. | Time at Temp. |
|---|---|---|
| Diesel Fuel | 23 | 24 hours |
| Dextron III Automatic Transmission Oil | 23 | 7 days |

Changes in tensile properties and mass were measured according to ASTM D47-1-79 procedures. C-die dumbbell specimen were used for tensile and mass change measurements. For each compound five dumbbells were placed in a glass jar separated by steel foil. The jar was filled with test fluid which completely submerged the dumbbells. At the end of the immersion period, the dumbbells were removed from the jars and allowed to cool. After dipping in acetone and lightly drying with lint-free paper towels, the weight and tensile properties were measured. Results are shown in Table 4.

TABLE 4

| Polymer ID | Oil Content[1] | Weight Gain % | Tensile Strength Before Immersion (psi) | Tensile Strength After Immersion (psi) | % Retention |
|---|---|---|---|---|---|
| | | | Diesel Fuel 23° C. for 24 Hours | | |
| SPEEB-4 | 50 | 61.7 | — | — | — |
| | 100 | 73.9 | 851 | 150 | 17.6 |
| | 150 | 73.6 | — | — | — |
| SPEEB-5 | 50 | 62.1 | 1434 | 333 | 23.2 |
| | 100 | 72.6 | 951 | 170 | 17.9 |
| | 150 | 81.0 | 978 | 99 | 10.1 |
| Polymer-4 | 50 | 94.2 | — | — | — |
| | 100 | 117.1 | 931 | 90 | 10.3 |
| | 150 | 128.1 | — | — | — |
| | | | Dexron III ATF 23° C. For 7 Days | | |
| SPEEB-5 | 50 | 22.5 | 1434 | 837 | 58.4 |
| | 100 | 20.8 | 951 | 658 | 69.2 |
| | 150 | 16.4 | 978 | 594 | 60.7 |
| Polymer-4 | 50 | 36.0 | — | — | — |
| | 100 | 37.3 | 931 | 579 | 62.2 |
| | 150 | 45.0 | — | — | — |

[1]Oil content expressed as parts by weight per 100 parts of polymer.

These results show that the polymers of the present invention have lower weight gains in solvent and better retention of mechanical properties than the block copolymer which does not contain a hydrogenated low vinyl block.

We claim:

1. A block copolymer comprising a formula structure of A-B-C-A or A-B-C-B-A wherein each A is a block of a vinyl aromatic hydrocarbon, and has a weight average molecular weight of 5,000 to 50,000, each B is a polybutadiene block having a weight average molecular weight of 1,000 to 15,000 and a vinyl content of less than 25% by weight, and C is an elastomeric conjugated diene polymer block having a weight average molecular weight of 25,000 to 200,000 and has a vinyl content of 35 to 90%, by weight.

2. The block copolymer of claim 1 wherein the weight average molecular weight of each A is from 7,500 to 30,000.

3. The block copolymer of claim 1 wherein the vinyl content of C is from 35 to 80% by weight.

4. The block copolymer of claim 3 wherein the vinyl content of C is from 35 to 70% by weight.

5. A block copolymer comprising a formula structure of A-B-C-A or A-B-C-B-A wherein each A is a block of a vinyl aromatic hydrocarbon, and has a weight average molecular weight of 5,000 to 50,000, each B is a hydrogenated polybutadiene block having a weight average molecular weight of 1,000 to 15,000 and a vinyl content prior to hydrogenation of less than 25% by weight, and C is an elastomeric hydrogenated conjugated diene polymer block having a weight average molecular weight of 25,000 to 200,000 and has a vinyl content prior to hydrogenation of 35 to 90%, by weight.

6. The block copolymer of claim 5, wherein C and B have a residual unsaturation less than about 1%.

7. The block copolymer of claim 5 wherein the weight average molecular weight of each A is from 7,500 to 30,000.

8. The block copolymer of claim 5 wherein the vinyl content of C prior to hydrogenation is from 35 to 80% by weight.

9. The block copolymer of claim 8 wherein the vinyl content of C prior to hydrogenation is from 35 to 70% by weight.

10. The block copolymer of claim 1 wherein the block copolymer has the formula structure A-B-C-A.

11. The block copolymer of claim 1 wherein the block copolymer comprises the formula structure A-B-C-B-A.

12. The block copolymer of claim 11 wherein the block copolymer is partially coupled.

13. A compound comprising 100 parts of the block copolymer of claim 1, from 0 to 300 parts by weight of a polymer selected from the group consisting of polyethylene, polypropylene, ethylene-propylene copolymers, polybutylene and poly(ethylene-alpha-olefin) copolymers, and from 0 to 400 parts by weight of an oil.

14. The compound of claim 13 wherein the block copolymer has a residual unsaturation less than about 1%.

* * * * *